(12) United States Patent
Muehlenbeck

(10) Patent No.: US 6,935,941 B1
(45) Date of Patent: Aug. 30, 2005

(54) FISH PIN BONE REMOVER

(76) Inventor: Thomas C. Muehlenbeck, 12120 Birch Run Rd., Birch Run, MI (US) 48415

( * ) Notice: Subject to any disclaimer, the term of this patent is extended or adjusted under 35 U.S.C. 154(b) by 27 days.

(21) Appl. No.: 10/791,512

(22) Filed: Mar. 2, 2004

(51) Int. Cl.[7] .............................................. A22B 5/10
(52) U.S. Cl. .................................................. 452/103
(58) Field of Search ........................ 452/2–5, 102–105, 452/137; 30/279.2, 283, 3; D7/642, 645, D7/649–652; D24/147

(56) References Cited

U.S. PATENT DOCUMENTS

| | | | |
|---|---|---|---|
| 221,949 A | 11/1879 | Whitney | |
| 1,117,355 A | 11/1914 | Erickson | |
| 1,226,797 A * | 5/1917 | Newman | 30/123.5 |
| 1,261,689 A | 4/1918 | Bristle | |
| 1,847,062 A | 2/1932 | Lemmon, Jr. | |
| 2,142,197 A * | 1/1939 | Lee | 452/137 |
| 2,274,815 A * | 3/1942 | Whann | 30/279.6 |
| 2,450,348 A * | 9/1948 | Krilow | 30/304 |
| 3,570,048 A | 3/1971 | Michael | |
| 4,574,431 A * | 3/1986 | Colling | 452/137 |
| 4,592,140 A | 6/1986 | Chasen | |
| 4,704,769 A | 11/1987 | Hanechak | |
| 4,920,612 A | 5/1990 | Moore | |
| D315,661 S | 3/1991 | Scheuerman | |
| 5,230,652 A * | 7/1993 | Alam | 452/98 |
| D342,000 S * | 12/1993 | Diotte | D7/693 |
| 5,529,534 A | 6/1996 | Adams | |
| D447,014 S * | 8/2001 | Van Leeuwen | D7/649 |

* cited by examiner

*Primary Examiner*—Thomas Price

(57) ABSTRACT

The fish pin bone remover has a handle and a blade member. The blade member is formed from a V-shaped blade blank. The blade blank has a left leg, a right leg and a bridge portion interconnecting the legs. The legs have inside edges and outside edges. The bridge portion has arcuate inside and outside edges. The bridge portion is formed to position the inside edges parallel to each other and spaced apart a selected distance. The outside edges of the legs are parallel to each other and spaced apart further than the inside edges. An outside surface of both legs and the bridge portion adjacent to the inside edges of the legs and the arcuate inside edge of the bridge is ground to form a continuous cutting edge that extends along the left inside edge the arcuate inside edge and the right inside edge.

8 Claims, 4 Drawing Sheets

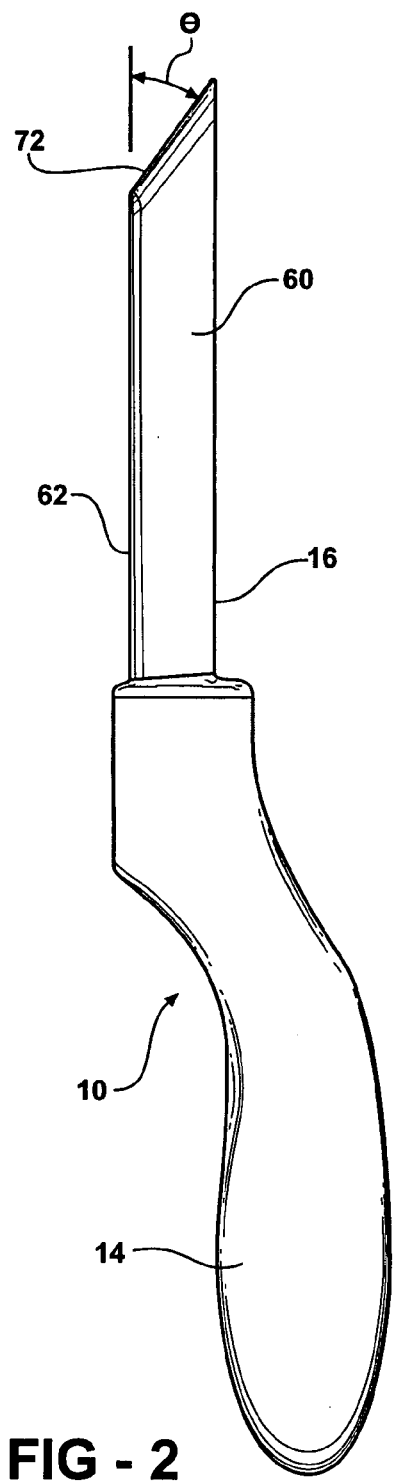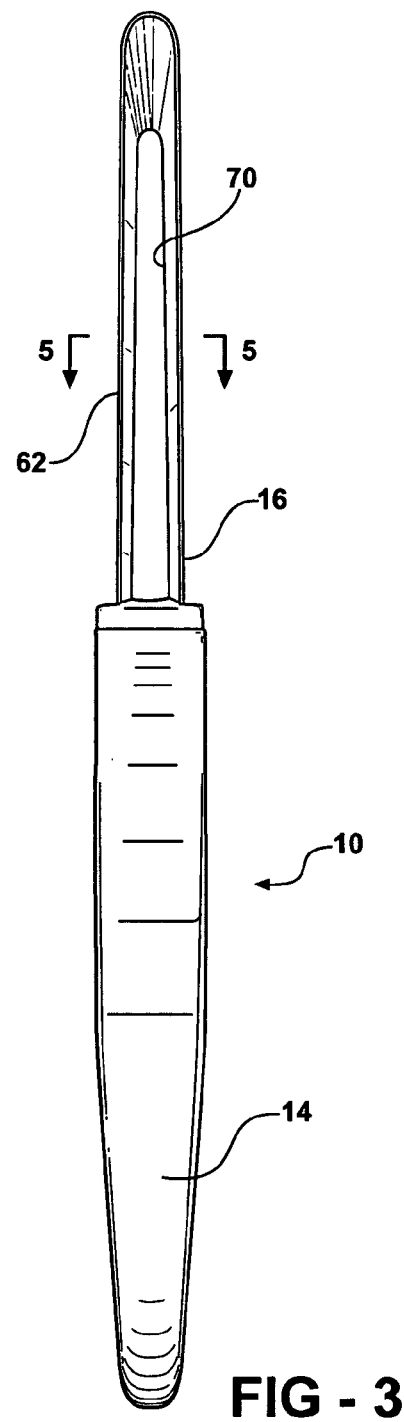
FIG - 2
FIG - 3

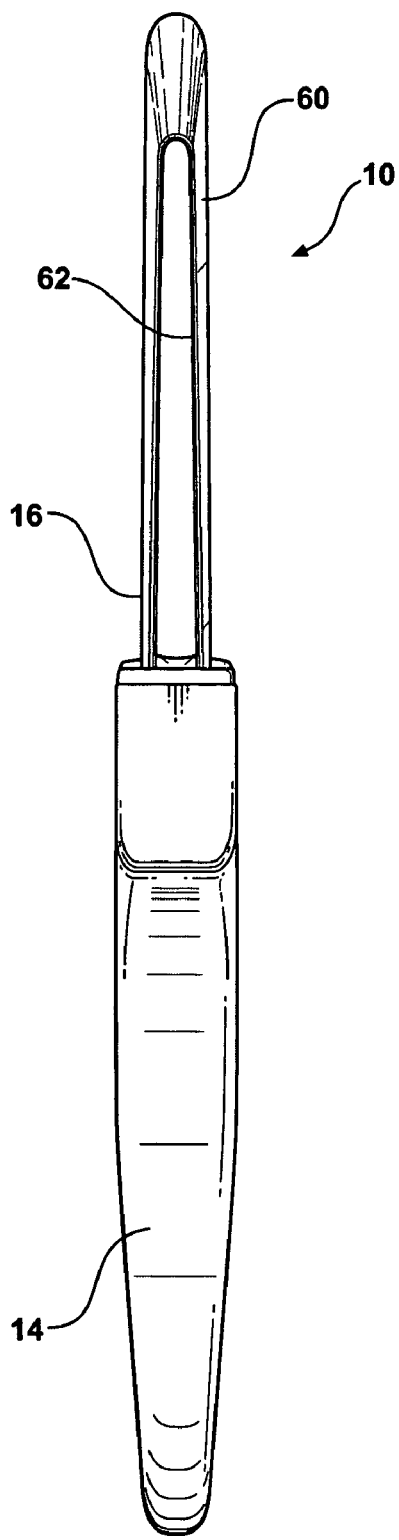
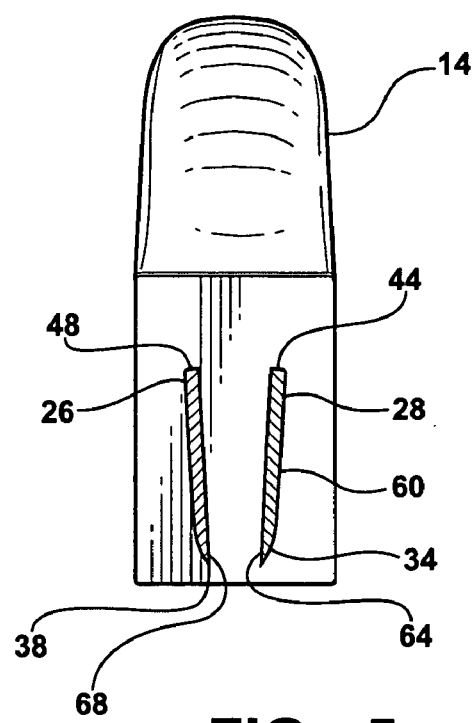
FIG - 4
FIG - 5

FISH PIN BONE REMOVER

CROSS REFERENCE TO RELATED APPLICATION

This application claims the benefit of the filing date of U.S. Provisional Application No. 60/452,278, titled "FISH PIN BONE REMOVER" filed Mar. 5, 2003.

TECHNICAL FIELD

The fish pin bone remover knife has a blade member formed by bending a V-shape blank about a mandrel until edges of the left leg and the right leg are parallel to each other, the joined ends of the left leg and the right leg are connected to each other by an arcuate bridge portion, a continuous edge of the left leg, the arcuate bridge portion and the right leg is sharpened to form a cutting edge, and a left leg free end and a right leg free end are both fixed to a handle.

BACKGROUND OF THE INVENTION

Fish are eviscerated and cut into fillets prior to cooking. The filleting process removes most of the bones. Unfortunately pin bones remain in many fish fillets following the filleting process. Many individuals do not like to remove bones from cooked fish and refuse to eat fish that has or may have bones. Commercial fish processors have large expensive machines for removing pin bones. Such machines are not available for use by sport fishermen that prepare fish they catch for cooking and to be eaten by friends and by themselves.

Individual fisherman generally eviscerate and fillet fish prior to cooking. Some fisherman leave the pin bones in the fillets and remove the pin bones while eating cooked fish. Others remove the pin bones prior to cooking. There are two common procedures for removing the pin bones from uncooked fish fillets. Needle nose pliers can be used to pull each pin bone from the fillet. This is a tedious and time consuming task and a few pin bones are generally missed. A sharp knife with one blade can be used to cut the pin bones from fillets. Cutting the pin bones out requires a first cut to one side of a row of pin bones. The first cut is generally easy because the fillet holds the pin bones in a relatively straight line. The second cut is generally more difficult because the pin bones are supported on one side only. The second cut is therefore a little further from the pin bones than the first cut. Cutting the fillets with a regular knife, to remove pin bones, removes a substantial portion of the eatable tissue and separates the fillet into at least two separate parts. The eatable tissue removed with the pin bones is lost.

SUMMARY OF THE INVENTION

The fish pin bone remover includes a left leg with a left inside edge and a left outside edge, a right leg with a right inside edge and a right outside edge, and a bridge portion that is integral with a left leg inner end and a right leg inner end. The bridge portion has an arcuate inside edge and an arcuate outside edge. A cutting edge is formed by grinding an outside surface of the left leg, the right leg and the bridge portion adjacent to the left inside edge, the arcuate inside edge and the right inside edge. The cutting edge includes a left cutting edge portion and arcuate cutting edge portion and a right cutting edge portion. The left cutting edge portion is substantially parallel to the right cutting edge portion. The arcuate cutting edge portion is in a common plane with the left cutting edge portion and the right cutting edge portion. A handle is fixed to the free left end of the left leg and to the free right end of the right leg. The left outside edge is outboard of the left cutting edge portion. The right outside edge is outboard of the right cutting edge portion.

The fish pin bone remover has a tip surface of the bridge portion that extends away from the arcuate cutting edge and the handle toward the arcuate outside edge at an angle, relative to the left cutting edge portion, between 35° and 55°.

BRIEF DESCRIPTION OF DRAWINGS

These and other objects, features and advantages will become more readily apparent in view of the following detailed description and best mode, appended claims and accompanying drawings, in which:

FIG. 2 is a side elevational view of the fish pin bone remover;

FIG. 3 is a top plan view of the fish pin bone remover;

FIG. 4 is a bottom plan view of the fish pin bone remover;

FIG. 5 is a sectional view of the fish pin bone remover taken along line 5—5 in FIG. 3.

DETAILED DESCRIPTION OF THE PREFERRED EMBODIMENTS

Figure 1:
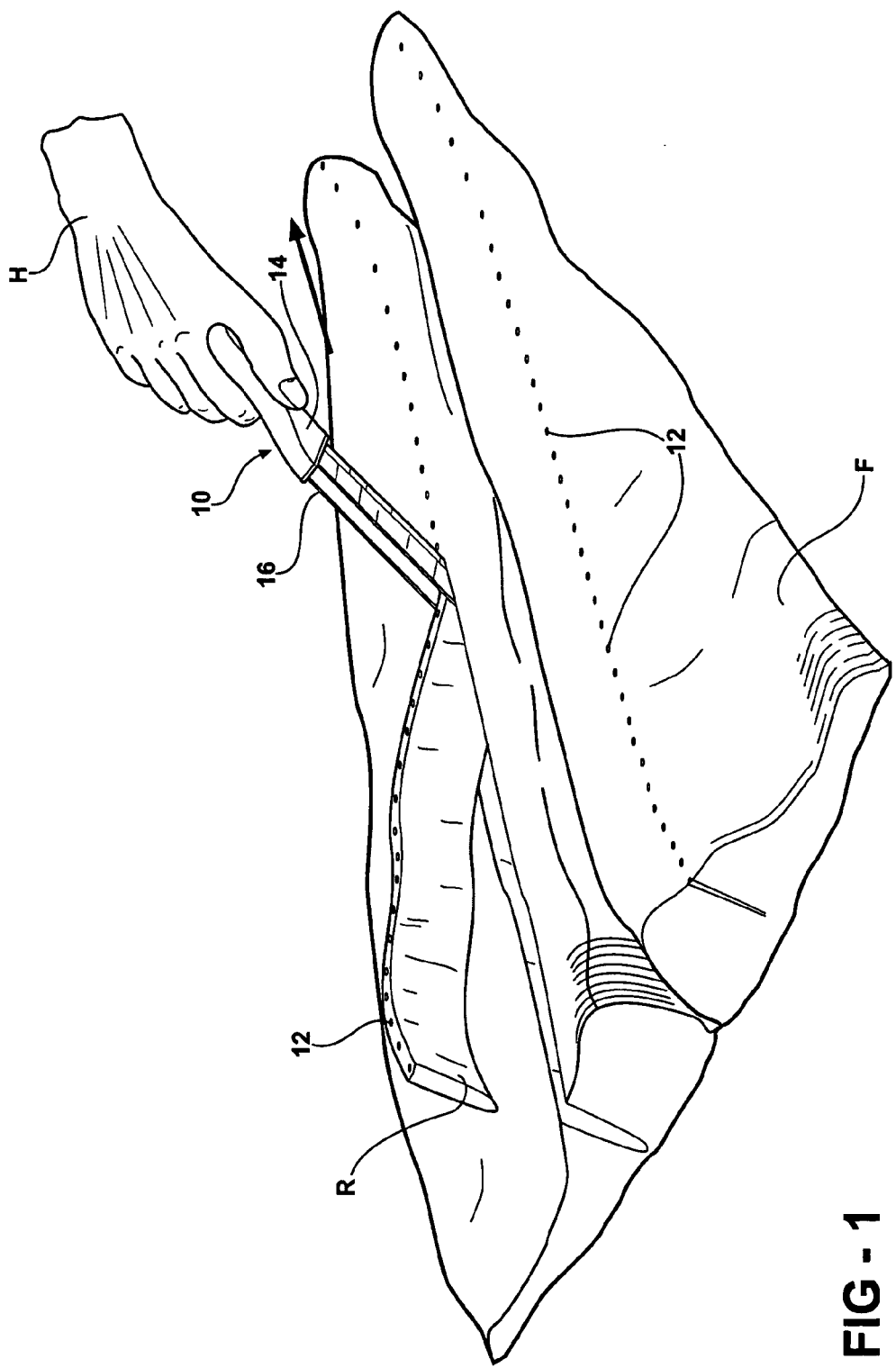
FIG. 1 is a perspective view of the pin bone remover cutting a thin ribbon of tissue with pin bones from a fish fillet.

The fish pin bone remover 10 for removing fish pin bones 12 from a fish fillet F includes a handle 14 and a blade member 16. The terms left and right are as seen by a person holding the pin bone remover in a hand H ready for use.

The blade member 16 has cut or severed from a strip 18 of material such as stainless steal. The strip 18 can extend from line 20 to line 22 shown in FIG. 6. If the strip 18 is three times the distance from the line 20 to the line 22, there can be additional columns of blade members 16 extending laterally outward from the lines 20 and 22.

Each blade member 16 is made from a V-shape blade blank 24. The blank 24 is a flat member with a left leg 26 and a right leg 28. The vertex where the left leg 26 and the right leg intersect is a bridge portion 30. The inner edge 32 of each V-shape blade blank 24 includes a straight left inside edge 34 of the left leg, an arcuate inside edge 36 of the bridge portion 30 and a straight right inside edge 38. The outer edge 40 of each V-shape blade blank 24 includes a left end edge 42, a straight left outside edge 44, an arcuate outside edge 46 of the bridge portion 30, a straight right outside edge 48, and a right end edge 50.

Figure 6:
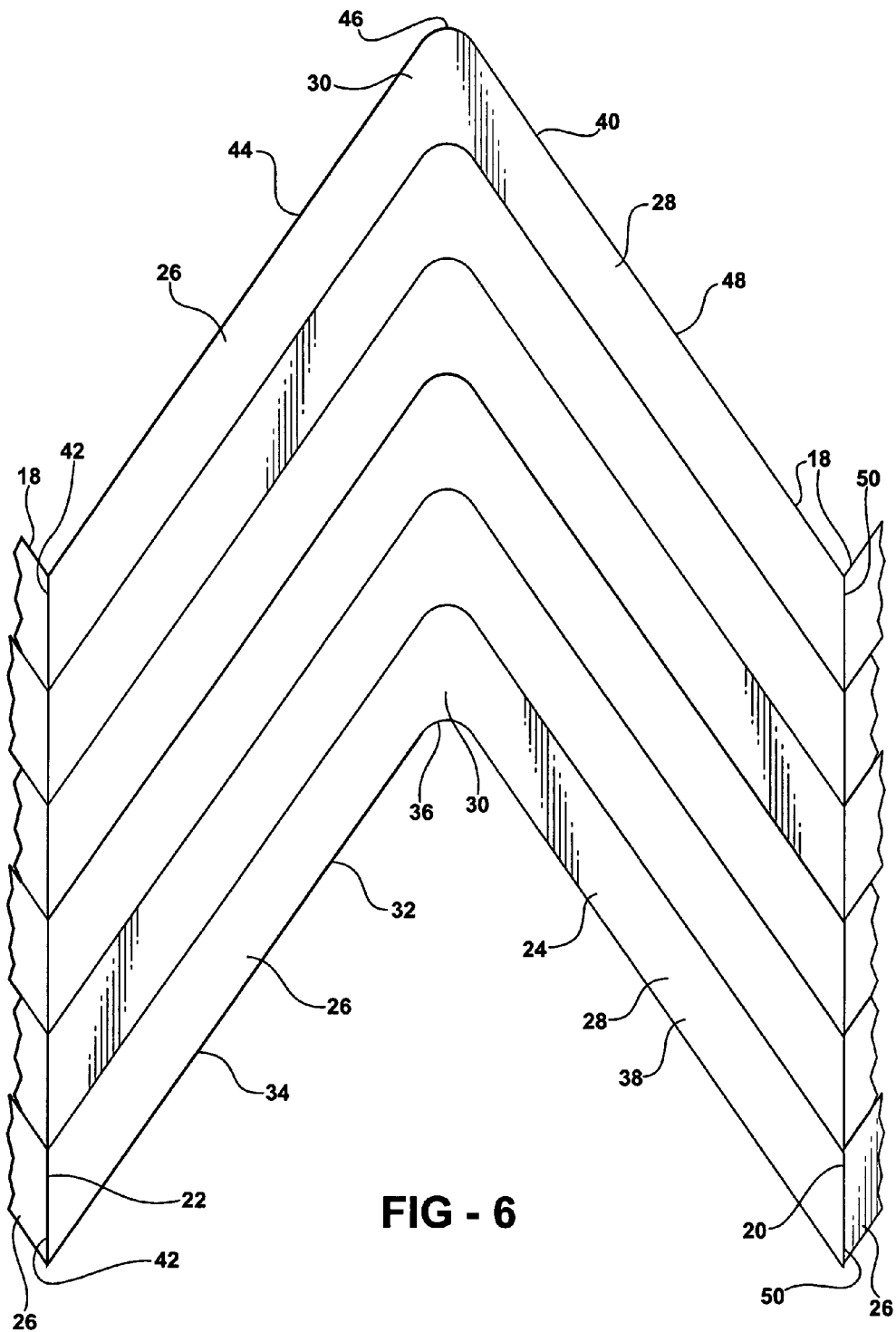
FIG. 6 is a plan view, with parts broken away, of V-shaped blades as they are separated from a cutting material strip.

The V-shape blank 24 is formed into a blade member 16 by bending the bridge portion 30 around a mandrel or similar tool that is at least partially conical. The bridge portion 30 is bent until the left inside edge 34 is parallel to the right inside edge 38. The arcuate inside edge 36 is an arc that extends about 180° about an arc axis and has an arc diameter of about $3/16^{th}$ of an inch. The arcuate outside edge 46 is an arc with an arc diameter that is somewhat larger than $3/16^{th}$ of an inch. The arcuate inside and outside edges 36 and 46 are the same length as shown in FIG. 6. Since the left leg 26 and the right leg 28 are both bent 90° from their flat position in a common plane and the arcuate outside edge 46 has a larger arc diameter, a small portion of the straight left outside edge 44 and the straight right outside edge 48 are curved during bending of the bridge portion 30. The length of the arcuate outside edge 46 can be increased if desired. However, some material would be scrapped if the arcuate inside and outside edges 36 and 46 have different lengths. The $3/16^{th}$ inch diameter arc length for the arcuate inside edge 36 places the straight left and right inside edges 34 and 38 about $3/16^{th}$ of an inch apart. The large arc diameter for the outside arcuate edge 46 spaces the straight left outside edge 44 from the straight right outside edge 48 a distance equal to the arc diameter for the outside arcuate edge. This extra distance between the straight outside edges 44 and 48 relative to the distance between the straight inside left edge and the straight inside right edge, as shown in FIG. 5, ensures that a thin ribbon of fish translucent tissue R with encased pin bones 12 can move freely between the left leg 26 and the right leg 28 after being severed from a fillet F.

The outside surface 60 of the left leg 26, the right leg 28, and the bridge portion 30 is ground adjacent to the straight left inside edge 34, the arcuate inside edge 36 and the straight right inside edge 38 to form a cutting edge 62 with a straight cutting edge portion 64, a curved or arcuate cutting edge portion 66, and a right straight cutting edge portion 68. The cutting edge 62 is a continuous cutting edge with the left cutting edge portion 64, the arcuate cutting edge portion 66, and the right cutting edge portion 68 substantially in a common cutting edge plane.

The distance between the straight cutting edge 64 and 68 is about $3/16^{th}$ of an inch for removing pin bones from most fish. This dimension permits the largest pin bones 12 encountered to pass through the slot 70 defined by the left cutting edge 64, the arcuate cutting edge 66 and the right cutting edge 68. The ribbon R of fish tissue is sufficiently thin for the person removing the pin bones 12 to see the removed bones through the fish tissue. If the pin bone remover tool 10 is used to remove pin bones 12 with larger diameters, it will be necessary to increase the width of the slot 70 to accommodate the larger pin bones 12. Two or more different pin bone remover tools 10 may be required to remove pin bones 12 from fish of different sizes.

The outside surface 60 of the blade member 16 includes a forward end tip surface 72 that insects the cutting edge 62 at an angle theta of about 45° as shown in FIG. 2. The surface 72 is normally held substantially parallel to the surface supporting the fillet F during pin bone removal. Since the cutting edge 62 of the arcuate cutting edge 66 is formed by grinding material from the outside surface 60, the cutting edge is positioned slightly above the tip surface 72. This makes it possible to remove pin bones 12 without cutting the skin of the fish. With some care, the pin bones 12 can be removed without separating a fillet F into multiple pieces. The angle of the tip surface 72 can be changed by changing the angle at which the left leg 26 of the V-shaped blade blank 24 intersects the right leg 28. The angle can vary between 35° and 55° depending upon the choice of a person removing pin bones 12. At an angle of 35° it may be difficult to remove pin bones 12 from a thick fish fillet. Above an angle of 55°, the handle 14 may need to be changed so that the palm of a person's hand is under the handle rather than on top of the handle.

The ends 42 and 50 of the legs 26 and 28 are attached to the handle 14 in a conventional manner. Holes may be drilled through the legs 26 and 28 for mechanical fasteners that fix the blade member 16 to the handle 14. Small notches can be cut into the legs 26 and 28 to anchor both legs in a molded handle 14. The legs 26 and 28 can also be bonded to the handle 14.

What is claimed is:

1. A fish pin bone remover comprising:
   a blade member including a left leg with a left inside edge and a left outside edge, a right leg with a right inside edge and a right outside edge, and a bridge portion integral with a left leg inner end and a right leg inner end and having an arcuate inside edge and an arcuate outside edge;
   a cutting edge formed by grinding an outside surface of the left leg, on outside surface of the right leg and an outside surface of the bridge portion adjacent to the left inside edge, the arcuate inside edge and the right inside edge and wherein the cutting edge includes a left cutting edge portion, an arcuate cutting edge portion and a right cutting edge portion and the cutting edge is continuous and without steps along at least a portion of the left leg, across the bridge portion and along at least a portion of the right leg, and the left cutting edge portion and the right cutting edge portion are substantially parallel to each other; and
   a handle fixed to a free left end of the left leg and to a free right end of the right leg.

2. A fish pin bone remover, as set forth in claim 1, wherein the left outside edge of the left leg is spaced from the right outside edge of the right leg a distance that exceeds the width of the space between the left cutting edge portion and the right cutting edge portion.

3. A fish pin bone remover, as set forth in claim 2, wherein a tip surface of the bridge portion extends away from the arcuate cutting edge portion and the handle toward the arcuate outside edge at an angle of about 45° relative to the left cutting edge portion and the right cutting edge portion.

4. A fish pin bone remover, as set forth in claim 2, wherein the left outside edge of the left leg is substantially parallel to the right outside edge of the right leg.

5. A fish pin bone remover, as set forth in claim 4, wherein the left outside edge of the left leg is substantially parallel to the left cutting edge portion, and the right outside edge of the right leg is substantially parallel to the right cutting edge portion.

6. A fish pin bone remover comprising:
   a blade member including a left leg with a left inside edge, and a left outside edge; a right leg with a right inside edge and a right outside edge, and bridge portion integral with a left leg inner end and a right leg inner end and having an arcuate inside edge and an arcuate outside edge;
   a cutting edge formed by grinding an outside surface of the left leg, the right leg and the bridge portion adjacent to the left inside edge, the arcuate inside edge and the right inside edge and wherein the cutting edge includes a left cutting edge portion an arcuate cutting edge portion and a right cutting edge portion, with the left cutting edge portion substantially parallel to the right cutting edge portion and the arcuate cutting edge portion in a common plane with the left cutting edge portion and the right cutting edge portion; and
   a handle fixed to a free left end of the left leg and to a free right end of the right leg and wherein the left outside edge is outboard of the left cutting edge portion and the right outside edge is outboard of the right cutting edge portion.

7. A fish pin bone remover, as set forth in claim 6 wherein a tip surface of the bridge portion extends away from the arcuate cutting edge and the handle toward the arcuate outside edge at an angle, relative to the left cutting edge portion, between 35° and 55°.

8. A fish pin bone remover comprising:

a blade member including a left leg with a left inside edge and a left outside edge, a right leg with a right inside edge and a right outside edge, and a bridge portion integral with a left leg inner end and a right leg inner end and having an arcuate inside edge and an arcuate outside edge;

a cutting edge formed by grinding an outside surface of the left leg, an outside surface of the right leg and an outside surface of the bridge portion adjacent to the left inside edge, the arcuate inside edge and the right inside edge and wherein the cutting edge includes a left cutting edge portion, an arcuate cutting edge portion and a right cutting edge portion and the cutting edge is continuous along at least a portion of the left leg, across the bridge portion and along at least a portion of the right leg, the left cutting edge portion and the right cutting edge portion are substantially parallel to each other;

wherein an arcuate cutting edge left end is in alignment with and joins a left cutting edge inner end and an arcuate cutting edge right end is in alignment with and joins a right cutting edge inner end, and a handle fixed to a free left end of the left leg and to a free right end of the right leg.

* * * * *